(12) United States Patent
Simonneaux et al.

(10) Patent No.: US 10,112,699 B2
(45) Date of Patent: Oct. 30, 2018

(54) METHOD OF PRELOADING AN AIRCRAFT ASSEMBLY, A PRELOADING TOOL AND AN AIRCRAFT ASSEMBLY

(71) Applicant: SAFRAN LANDING SYSTEMS UK LTD, Gloucester (GB)

(72) Inventors: Yann Simonneaux, Gloucester (GB); Andrew Paddock, Gloucester (GB)

(73) Assignee: Safran Landing Systems UK LTD (GB)

( * ) Notice: Subject to any disclaimer, the term of this patent is extended or adjusted under 35 U.S.C. 154(b) by 146 days.

(21) Appl. No.: 15/190,335

(22) Filed: Jun. 23, 2016

(65) Prior Publication Data
US 2016/0375989 A1    Dec. 29, 2016

(30) Foreign Application Priority Data

Jun. 23, 2015    (EP) .................................... 15173404

(51) Int. Cl.
| *B64C 25/10* | (2006.01) |
| *B64C 25/12* | (2006.01) |
| *B64F 5/10* | (2017.01) |
| *B64F 5/60* | (2017.01) |

(52) U.S. Cl.
CPC .............. *B64C 25/10* (2013.01); *B64C 25/12* (2013.01); *B64F 5/10* (2017.01); *B64F 5/60* (2017.01)

(58) Field of Classification Search
CPC . B64C 25/10; B64C 25/12; B64F 5/10; B64F 5/60
See application file for complete search history.

(56) References Cited

U.S. PATENT DOCUMENTS

| 2010/0181422 A1 | 7/2010 | Thompson |
| 2011/0004199 A1 | 1/2011 | Ross |
| 2015/0075309 A1 | 3/2015 | Holloway |

FOREIGN PATENT DOCUMENTS

| GB | 2507823 | 5/2014 |

OTHER PUBLICATIONS

Extended European Search Report dated Jan. 5, 2016 for European Application No. 15173404.3, 9 pages.

*Primary Examiner* — Ryan J Walters
(74) *Attorney, Agent, or Firm* — RatnerPrestia

(57) ABSTRACT

A method of preloading an aircraft assembly involving a step of operating an extendible preloading tool to move a landing gear strut to decrease the distance between first and second link attachment joints for attachment of a preloading linkage. A tool and aircraft assembly are also provided.

14 Claims, 3 Drawing Sheets

METHOD OF PRELOADING AN AIRCRAFT ASSEMBLY, A PRELOADING TOOL AND AN AIRCRAFT ASSEMBLY

This application claims the benefit of and priority to European Application 15173404.3, filed Jun. 23, 2015, the contents of which are incorporated herein by reference.

BACKGROUND TO THE INVENTION

An aircraft assembly generally includes a landing gear assembly, which is generally movable between a deployed condition, for take-off and landing, and a stowed condition for flight.

An actuator is provided for moving the landing gear assembly between the deployed condition and the stowed condition. This actuator is known in the art as a retraction actuator. A retraction actuator may have one end coupled to the airframe and another end coupled to the main strut such that extension and retraction of the actuator results in movement of the main strut between the deployed and stowed conditions.

It is common for a landing gear assembly to be arranged to move towards the deployed condition in the event of a failure of the retraction actuator. Initially, the main strut will move towards the deployed condition by way of gravity. One or more down-lock springs are generally provided to assist in moving the landing gear assembly to the deployed condition and locking it in that state by urging a preloading linkage to assume a locked condition in which the main strut is fully deployed and locked in that state by the lock link.

In a three point attachment landing gear assembly, also known as a single stay landing gear assembly, a brace or stay is generally provided to support the orientation of the main fitting when the landing gear is in the deployed condition. A stay generally includes a two bar linkage that can be unfolded to assume a generally aligned condition in which the stay is locked by a lock link to inhibit movement of the main strut.

In a four point attachment landing gear assembly, also known as a dual stay landing gear assembly, a pair of stays are coupled to a common main strut, with a forward stay extending in front of the main strut and an aft stay extending behind the main strut. The stays can be side stays provided on the same side of the main strut. In either case, a lock link is generally provided in conjunction with each stay to maintain the stay in the locked condition.

A lock link generally includes a two bar linkage between the stay centre joint and the main strut or airframe structure. The lock link in its locked position is kept over-centre against mechanical stops via down-lock springs. An actuator usually coupled between one of the lock link and stay linkages is used to overcome the spring force and pull the lock link out of lock to enable the stay to be folded, thereby permitting the main strut to be moved by the retraction actuator towards the stowed condition. In another example, the preloading linkage can be in the form of a toggle link.

When a landing gear is deployed for landing, aerodynamic loading results in elastic deformation of the assembly, which can change the nominal distance between the stay attachment points; this distance will be referred to herein as the 'preloading distance'. This is particularly so for dual stay landing gears, where the attachment joints for the rearmost stay become closer to one another.

Down-lock springs are sized to overcome loads acting on an associated stay and/or lock link as a result of the change in landing gear geometry as it assumes the deployed condition. In order to reduce the amount of energy required from a down-lock spring, and therefore its size and mass, it is known for a stay to be manufactured to a length which corresponds to the preloading distance. These types of stay will be referred to as a 'preloading linkage'. By providing a preloading linkage, the assembly is pre-loaded to help the down-lock spring to move the preloading linkage into a locked condition, enabling the down-lock spring to be smaller and/or lighter and in some cases also helping to ensure that both stays are locked.

In order to fit a preloading linkage into an aircraft assembly, it is necessary to set the assembly to change the distance between the first and second link attachment joints from the default distance to a distance which substantially corresponds to the preloading distance. The preloading linkage is often provided with adjustable fittings which can be used to adjust the link attachment joints in view of tolerances in the assembly.

In another example, the preloading linkage can be in the form of a shortening mechanism linkage, where the shock absorber or trailing arm requires to be shortened during retraction. The preloading linkage is used to ensure the correct stowage position and down-lock of the landing gear assembly.

In another example, the preloading linkage can be in the form of a rotating mechanism linkage, where the wheels require to be rotated during retraction. The preloading linkage is used to ensure the correct stowage position and down-lock of the landing gear assembly.

The present inventors have identified that preloading an aircraft assembly for attachment of a preloading linkage can be a difficult and/or a time consuming operation. Also, it can be challenging to force the assembly to accurately achieve the preloading distance.

SUMMARY OF INVENTION

According to a first aspect of the invention there is provided a method of preloading an aircraft assembly for fitting a preloading linkage, the aircraft assembly comprising:
  a strut mounting joint;
  a main landing gear strut movably coupled to the strut mounting joint so as to be movable between a deployed condition, for take-off and landing, and a stowed condition for flight, the main strut including a first link attachment joint arranged to be coupled to a first fitting of the preloading linkage;
  a second link attachment joint arranged to be coupled to a second fitting of the preloading linkage; and a first tool attachment joint mechanically coupled to the main strut to define a load path between them,
  the method comprising:
  actuating a variable length preloading tool coupled between the first tool attachment joint and an anchor point having a known spatial relationship with respect to the aircraft assembly to cause the tool to change between:
    a first extension state in which the main strut is in a default, deployed position and where the distance between the first link attachment joint and the second link attachment joint is a default distance, and
    a second extension state in which the main strut is moved from the default, deployed position and where the distance between the first and second link attachment joints substantially corresponds to the preloaded distance between the first and second fittings of the stay.

Thus, the method according to the first aspect employs an extendable preloading tool which is used to preload the assembly by moving the strut to accurately position the first link attachment joint relative to the second link attachment joint for attachment of the preloading stay. Knowing the kinematics of the assembly, the preloading tool can be operated to a predetermined extension state which orientates the main strut such the distance between the first and second link attachment joints is substantially the distance required for fitting the preloading linkage, such as a preloading length stay, thereby enabling an installation engineer to quickly and accurately apply a correct level of preloading to the assembly.

The relative displacement between the first and second tool attachment joints as the tool is actuated between the first and second extension states can be relatively large in comparison to the relative displacement between the first and second link attachment joints. This can help an assembly engineer to set a correct level of link attachment joint displacement and therefore preload because any minor error on the input side when controlling the length of the preloading tool will result in a smaller error on the output side in terms of link attachment joint displacement.

The ratio of tool displacement to link attachment joint displacement can be 10:1 as an example. The greater the ration the more accurate and simple for the assembly engineer to install the preloading stay.

The method can include the step of providing the preloading tool and coupling it to the first and second tool attachment joints. Thus, the tool can be a non-operational part of the assembly that is applied purely for the purpose of preloading the assembly and then removed prior to operational service. This can provide more flexibility in terms of tool design.

In accordance with a second aspect of the invention, there is provided a preloading tool for preloading an aircraft assembly prior to fitting a preloading linkage, the aircraft assembly comprising:
 a strut mounting joint;
 a main landing gear strut movably coupled to the strut mounting joint so as to be movable between a deployed condition, for take-off and landing, and a stowed condition for flight, the main strut including a first link attachment joint arranged to be coupled to a first fitting of the preloading linkage;
 a second link attachment joint arranged to be coupled to a second fitting of the preloading linkage; and
 a first tool attachment joint mechanically coupled to the main strut to define a load path between them,
 the preloading tool comprising:
 a first fitting arranged to be coupled to the first tool attachment joint and a second fitting arranged to be coupled to an anchor point having a known spatial relationship with respect to the aircraft assembly; and
 an actuator operable to control the distance between the first and second fittings such that the tool is actuatable or operable between
  a first extension state in which the main strut is in a default, deployed position and where the distance between the first link attachment joint and the second link attachment joint is a default distance, and
  a second extension state in which the main strut is moved from the default, deployed position and where the distance between the first and second link attachment joints substantially corresponds to the preloaded distance between the first and second fittings of the stay.

In accordance with a third aspect of the invention, there is provided an aircraft assembly comprising:
 a strut mounting joint;
 a main landing gear strut movably coupled to the strut mounting joint so as to be movable between a deployed condition, for take-off and landing, and a stowed condition for flight, the main strut including a first link attachment joint arranged to be coupled to a first fitting of the preloading linkage;
 a second link attachment joint arranged to be coupled to a second fitting of the preloading linkage;
 a first tool attachment joint mechanically coupled to the main strut to define a load path between them; and
 a preloading tool for preloading the aircraft assembly prior to fitting a stay, the preloading tool comprising:
 a first fitting arranged to be coupled to, or coupled to, the first tool attachment joint and a second fitting arranged to be coupled to, or coupled to, an anchor point having a known spatial relationship with respect to the aircraft assembly; and
 an actuator operable to control the distance between the first and second fittings such that the tool is actuatable between
  a first extension state in which the main strut is in a default, deployed position and where the distance between the first link attachment joint and the second link attachment joint is a default distance, and
  a second extension state in which the main strut is moved from the default, deployed position and where the distance between the first and second link attachment joints substantially corresponds to the preloaded distance between the first and second fittings of the stay.

Optional features of the first, second, and third aspects will now be set out.

The first tool attachment joint can be provided on an element of the aircraft assembly, such as a stay element of the forward stay, a lock link element, or the strut. Thus, existing elements of the assembly can be utilised in the preloading operation.

The second tool attachment joint can be provided on an element of the aircraft assembly, such as a stay element, a lock link element, or the airframe. Thus, existing elements of the assembly can be utilised in the preloading operation.

It is preferred from a weight saving perspective that the first and second tool attachment joints are defined by conventional, operational landing gear assembly joints; for example, the first tool attachment joint can be defined by the forward stay down-lock spring mounting lugs, and the second tool attachment joint can be defined by the forward lock link ground-lock pin lugs.

The tool can comprise a component of the assembly, such as an actuator; for example, the lock link 'unlock' hydraulic actuator. In such a case, a sleeve can be coupled between one end of the actuator and the lock link such that full extension of the actuator results in the required amount of relative displacement between the first and second tool attachment joints to achieve the predefined distance between the first and second link attachment joints.

The actuator can comprise an electro-mechanical actuator or a manual mechanical actuator which can be driven to an exact extension state that results in the required amount of relative displacement between the first and second tool attachment joints to achieve the predefined distance between the first and second link attachment joints.

The tool can include a gearing mechanism arranged to provide a ratio of at least 1.1:1, in some cases at least 2:1 between actuator movement and tool extension state. This can improve accuracy.

The tool can include a meter or gauge which provides a visual reading corresponding to its extension state, in order to assist an operator in actuating the tool to the required extension state in cases where the required extension state does not correspond to a maximum extension state.

The tool can include a load cell arranged to measure the amount of load required to relieve the preloading following fitting of the second stay, which can be used to measure the amount of load required to relieve the preloading following fitting of the second stay.

The preloading linkage can comprise a stay, such as an aft stay in a dual stay landing gear.

The aircraft assembly can include a second stay arranged to be coupled to a third link attachment joint on the main strut and a fourth link attachment joint on the airframe. The second stay can be of default size i.e. not preloading size.

Where two stays are provided, the first can be an aft stay and the second can be a forward stay.

Each stay can comprise a conventional two bar foldable stay coupled to a lock link to form a stay assembly including one or more down lock springs arranged to urge the down-lock assembly to assume a locked condition in which the main strut is in the deployed condition.

BRIEF DESCRIPTION OF THE DRAWINGS

Embodiments of the invention will now be described, strictly by way of example only, with reference to the accompanying drawings, of which.

DESCRIPTION OF THE EMBODIMENTS

Figure 1:
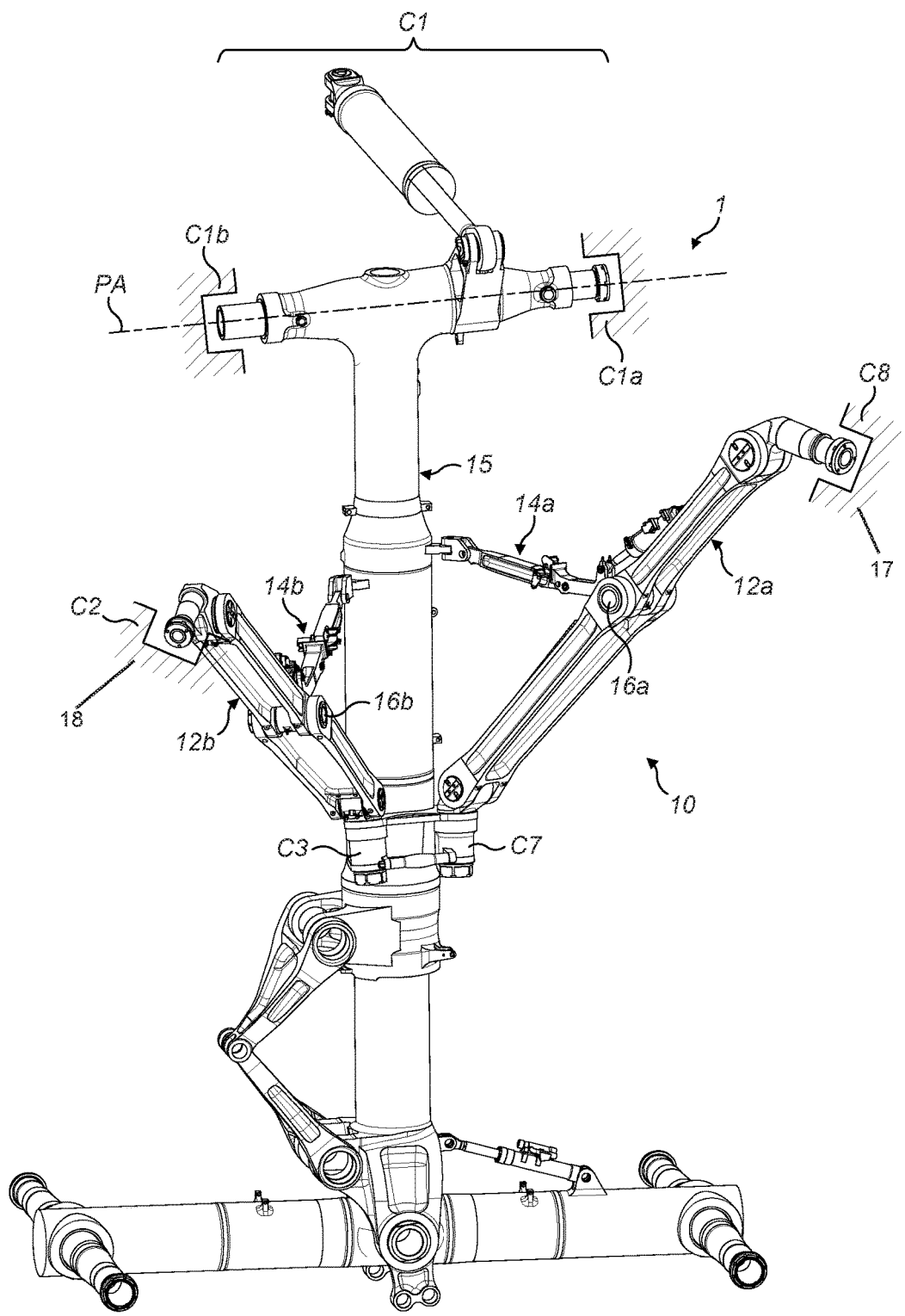
FIG. 1 is a diagram of a known aircraft gear assembly including a dual stay landing gear assembly.

Referring first to FIG. 1, an aircraft assembly including a dual stay landing gear assembly 10 is shown generally at 1.

The airframe of the assembly 1 includes a main strut mounting joint C1 to which a main landing gear strut 15 is coupled to be movable between a deployed condition, for take-off and landing, and a stowed condition for flight. In this embodiment the main strut 15 is a conventional shock absorbing strut including a main fitting and a slider, but can take any suitable form.

In this embodiment the strut mounting joint C1 has two connection points C1a, C1b arranged to pivotally mount a pair of cantilevered pintle pins at the top of the main strut 15. The strut mounting joint C1 mounts the strut 15 to pivot about a pintle axis PA in a movement plane which is generally orthogonal with respect to the pintle axis PA. However, in other embodiments, any suitable strut mounting joint may be provided to movably couple the strut 15 to the airframe.

The landing gear assembly 10 includes a pair of stays in the form of conventional forward and aft 'rolling-folding' stays 12a, 12b, each coupled to a conventional lock link 14a, 14b. Each stay 12a, 12b is arranged to be moved between a folded condition, in which the landing gear assembly 10 is stowed for flight, and a generally straight or aligned condition, in which the landing gear assembly 10 is deployed for take-off and landing.

The main strut 15 includes a first link attachment joint C3 arranged to be movably coupled to a lower fitting of the aft stay 12b, the distal end of which is provided with an upper fitting arranged to be movably coupled to a second link attachment joint C2 on the airframe. In the illustrated embodiment, the second link attachment joint C2 is an aft side-stay cardan pin attached to an integral socket on the gear beam 18, but any suitable joint C2 can be provided.

The forward stay 12a is coupled between a third link attachment joint C7 mounted on the main strut 15 and a fourth link attachment joint C8 mounted on the airframe. In the illustrated embodiment the fourth link attachment joint C8 is a forward side-stay shackle type pin attached to an aircraft fitting 17, which in turn is attached to the rear spar, but any suitable joint C8 can be provided.

In order to account for tolerances, aft stay 12b has at least one adjustable end fitting for accurate coupling to the aircraft assembly joints.

The four attachment points C1a, C1b, C2 and C8 result in static indeterminacy, hence the relative deflections of the landing gear parts and airframe structure must be determined to predict load magnitudes. The deflections can include the results of ground loads exerted on the landing gear and flight loads exerted on the airframe.

In operational use, when the landing gear is fully extended and the two stays 12a, 12b are locked, the landing gear exhibits a high degree of fore-aft stiffness whilst experiencing both ground and aerodynamic loads. During flight, when the stays 12a, 12b are unlocked, the landing gear fore-aft stiffness is reduced. The aerodynamic loads tend to deflect the main strut 15 backwards and also induce both twist and bending to the wing portion of the airframe. These conditions result in a change to the landing gear geometry. The distance between the aft stay 12b attachment points C2, C3 reduces and the distance between the forward stay 12a attachment points C7, C8 increases. This preloading distance between the aft stay 12b attachment points C2, C3 can be determined via conventional down-locking analysis.

The forward and aft stays 12a, 12b each have a generally aligned condition in which they react movement of the main strut 15 in a plane of movement to maintain the strut 15 in the deployed condition.

The down-lock springs for each stay 12a, 12b are sized to overcome the loads acting in the stays 12a, 12b as a result of the change in landing gear geometry as described above. In order to reduce the amount of energy required from the spring and therefore its size and mass, it is known for the aft stay 12b to be manufactured shorter than the unloaded distance between the first and second link attachment joints C2, C3, which equate to its nominal un-deflected, or default length. The shortened, preloading length stay 12b reduces the amount of landing gear assembly deflection required to push the stay 12b into lock in comparison to a stay of default length.

Figure 2:
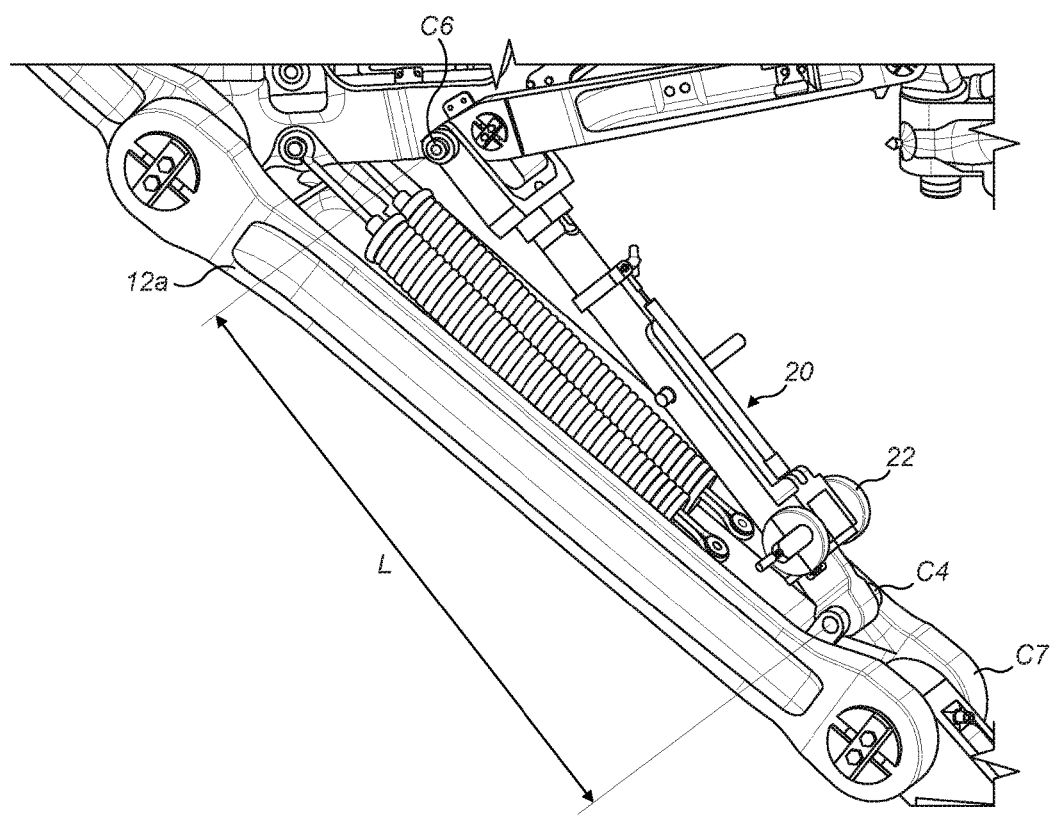
FIG. 2 shows elements of the landing gear assembly of FIG. 1 in conjunction with a preloading tool according to an embodiment of the invention.

Referring additionally to FIG. 2, in order to install the aft stay 12b, a preloading tool 20 according to an embodiment of the invention is provided. The preloading tool 20 is coupled between a first tool attachment joint C4 and a second tool attachment joint C6 arranged such that a change in the length L of the tool 20 results in a change in the angular position of the main strut 15 and a change in the distance between the first and second link attachment joints C2, C3 for mounting the aft stay 12b.

In the illustrated embodiment the first tool attachment joint C4 is defined by the forward stay down-lock spring mounting lugs; however, in other embodiments the first tool attachment joint C4 can be defined by any suitable element which is coupled to the main strut 15 to define a load path such that the first tool attachment joint C4 can be moved in order to move the main strut 15.

In the illustrated embodiment the second tool attachment joint C6 is defined by the forward lock link ground-lock pin lugs; however, in other embodiments the second tool attachment joint C6 can be defined by any suitable element which is either part of the aircraft assembly 1, or is anchored in position with a known spatial relationship with respect to the aircraft assembly 1, and is capable of reacting extension of the tool 22 such that the tool 20 can move the main strut 15.

Thus, in the illustrated embodiment, the length of the tool 20 can be increased to unlock the forward stay 12a and partially retract the strut 15 assembly about the pintle axis PA until the distance between the first and second link attachment joints C2, C3 equates to the predetermined shortened length of the aft stay 12b, as set out above. In one example, the strut 15 can be rotated by approximately 0.5°. The geometric relationship between the tool 20 displacement (input) and the change in the distance between the first and second link attachment joints C2, C3 (output) is determined by the kinematic motion of the forward stay 12a members and strut 15. In other embodiments, the relationship between the tool 20 displacement and the change in the distance between the first and second link attachment joints C2, C3 can be calculated without undue burden providing the geometry of the assembly and the kinematic relationships between joints C1 to C8 are known.

Figure 3:
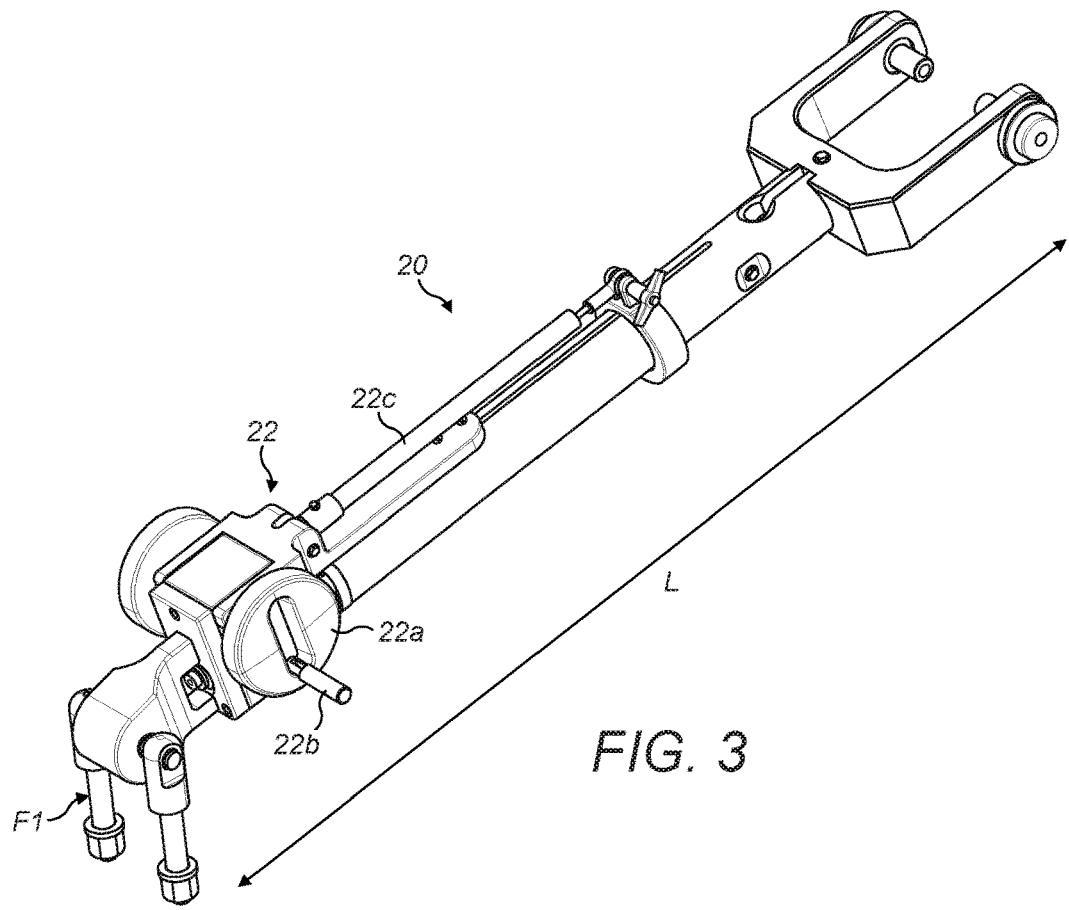
FIG. 3 is a diagram of the preloading tool of FIG. 2.

Referring additionally to FIG. 3, the preloading tool 20 includes an actuator 22 operable to control the length L of the tool 20 to define the distance between the first and second tool attachment joints C4, C6 such that the tool 20 can be operated to move the main strut to an orientation in which the distance between the first and second link attachment joints C2, C3 equates to the shortened length of the aft stay 12b.

In the illustrated embodiment, the length of the tool 20 can be preloading by manually turning a handle 22b which rotates a wheel 22a coupled to a gearbox of ratio 2:1 which in turn is linked to a roller screw of pitch 5 mm. An adjustable ruler 22c can be provided. One wheel turn results in a 2.5 mm displacement of the tool and approximately 0.25 mm change between the aft stay attachment points C2, C3.

In other embodiments, any suitable actuator can be provided by which a user can control the length of the tool 20 to set it to a predetermined extension state. In one example, the tool can comprise an operational component of the assembly, such as the lock link 'unlock' hydraulic actuator. In such a case, a sleeve can be coupled between one end of the actuator and the lock link such that full extension of the actuator results in the required amount of relative displacement between the first and second tool attachment joints to achieve the predefined distance between the first and second link attachment joints. In another example, an electro-mechanical actuator can be provided to define the length of the tool, such as a stepper motor serving in place of the wheel and gearbox arrangement shown in FIG. 3, or a conventional electro-mechanical actuator with end fittings arranged to be coupled to the first and second tool attachment joints C4, C6.

In the illustrated embodiment, the tool 20 includes a position transducer (not shown) arranged to provide a digital reading of the tool displacement, which can be directly related to the aft stay foreshortening length. Another digital reading has the capability to provide the load while resetting the forward stay 12a in its down-lock position.

Figure 4:
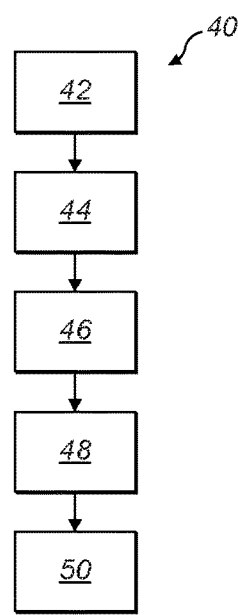
FIG. 4 is a flow chart of a method according to an embodiment of the invention.

Referring additionally to FIG. 4, a flow chat is shown illustrating a method 40 of assembling an aircraft assembly in a preloaded condition.

At step 42, with the strut 15 fitted to the airframe via the strut mounting joint C1 and optionally with the forward stay 12a fitted to the seventh and fourth link attachment joints C7, C8 and arranged in the generally aligned and locked condition, the preloading tool 20 can be coupled to the first and second tool attachment joints C4, C6. In some embodiments the tool 20 can be an operational component of the assembly.

At step 44, the preloading tool is actuated to extend to a predetermined extension state, thereby setting the distance between the first and second tool attachment joints C4, C6 which moves the main strut 15 to an orientation in which the distance between the first and second link attachment joints C2, C3 is substantially the correct distance for fitting the relatively short aft stay 12b. Tolerance stack up means that the distance between the first and second link attachment joints C2, C3 is unlikely to match exactly the distance between the fittings of the aft stay 12b; however, the present inventors have found the tolerance to be within acceptable limits that enable an installation engineer to use the adjustable end fittings to fit the stay 12b without concern.

At step 46, the aft stay (12b) is fitted to the first and second link attachment joints (C2, C3). The adjustable end fittings of the stay are engaged with the first and second link attachment joints (C2, C3).

At step 48 the method can optimally comprise subsequently relieving the preload by operating the actuator to shorten the tool.

At step 50 the method can optionally comprise removing the preloading tool following the step of relieving the preload.

Although in the described embodiments the preloading linkage is an aft stay, in other embodiments preloading link can be other conventional links such as a forward stay, or a shortening or rotating link.

Although the preloading linkage described herein has been shortened, due to it being an aft stay, in other embodiments the preloading linkage can be lengthened in comparison to the default length.

Thus, a preloading tool as described herein can be used to preload an aircraft assembly by moving the main strut to accurately position the first link attachment joint relative to the second link attachment joint for attachment of a preloading linkage such as a shortened aft stay. Knowing the kinematics of the assembly, the preloading tool can be operated to a predetermined, repeatable extension state which orientates the main strut such the distance between the first and second link attachment joints is the required distance required for fitting the link, thereby increasing the likelihood of a correct level of preloading being applied to the assembly and enabling the link to be fitted in a quick and convenient manner.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. A method of preloading an aircraft assembly for fitting a preloading linkage, the aircraft assembly comprising:
   a strut mounting joint;
   a landing gear strut movably coupled to the strut mounting joint so as to be movable between a deployed condition, for take-off and landing, and a stowed condition for flight, the landing gear strut including a first link attachment joint arranged to be coupled to a first fitting of the preloading linkage;
   a second link attachment joint arranged to be coupled to a second fitting of the preloading linkage; and
   a first tool attachment joint mechanically coupled to the landing gear strut to define a load path between the first tool attachment joint and the strut;
   the method comprising:
   actuating a variable length preloading tool coupled between the first tool attachment joint and an anchor point having a known spatial relationship with respect to the aircraft assembly to cause the tool to change from:
      a first extension state in which the landing gear strut is in a default, deployed position and where the distance between the first link attachment joint and the second link attachment joint is a default distance, to
      a second extension state in which the landing gear strut is moved from the default, deployed position and where the distance between the first and second link attachment joints substantially corresponds to the preloaded distance between the first and second fittings of the preloading linkage.

2. The method according to claim 1, whereby the relative displacement between the first and second tool attachment joints as the tool is actuated between the first and second extension states is relatively large in comparison to the relative displacement between the first and second link attachment joints.

3. The method according to claim 1, whereby the ratio of tool displacement to link attachment joint displacement is at least 5:1.

4. The method according to claim 1, further comprising a step of providing the preloading tool and coupling it to the first and second tool attachment joints.

5. An aircraft assembly comprising: a strut mounting joint;
   a landing gear strut movably coupled to the strut mounting joint so as to be movable between a deployed condition, for take-off and landing, and a stowed condition for flight, the landing gear strut including a first link attachment joint arranged to be coupled to a first fitting of a preloading linkage;
   a second link attachment joint arranged to be coupled to a second fitting of the preloading linkage;
   a first tool attachment joint mechanically coupled to the landing gear strut to define a load path between the first tool attachment joint and the strut; and
   a preloading tool for preloading the aircraft assembly prior to fitting the preloading linkage, the preloading tool comprising:
      a first fitting arranged to be coupled to the first tool attachment joint and a second fitting arranged to be coupled to an anchor point having a known spatial relationship with respect to the aircraft assembly; and
      an actuator operable to control the distance between the first and second fittings such that the tool is actuatable between
         a first extension state in which the landing gear strut is in a default, deployed position and where the distance between the first link attachment joint and the second link attachment joint is a default distance, and
         a second extension state in which the landing gear strut is moved from the default, deployed position and where the distance between the first and second link attachment joints substantially corresponds to the preloaded distance between the first and second fittings of the preloading linkage.

6. The aircraft assembly according to claim 5, wherein the first tool attachment joint is provided on an element of the aircraft assembly.

7. The aircraft assembly according to claim 5, wherein the second tool attachment joint is provided on an element of the aircraft assembly.

8. The aircraft assembly according to claim 5, wherein the first and second tool attachment joints are defined by conventional, operational landing gear assembly joints.

9. The aircraft assembly according to claim 5, wherein the tool comprises a component of the assembly.

10. The aircraft assembly according to claim 9, wherein the actuator comprises an electro-mechanical actuator or a manual mechanical actuator which can be driven to an exact extension state that results in the required amount of relative displacement between the first and second tool attachment joints to achieve the predefined distance between the first and second link attachment joints.

11. The aircraft assembly according to claim 5, wherein the tool includes a gearing mechanism arranged to provide a ratio of at least 1.1:1.

12. The aircraft assembly according to claim 5, wherein the tool includes a meter or gauge which provides a visual reading corresponding to its extension state, in order to assist an operator in actuating the tool to the required extension state in cases where the required extension state does not correspond to a maximum extension state.

13. The aircraft assembly according to claim 5, wherein the tool includes a load cell arranged to measure the amount of load required to relieve the preloading following fitting of the second stay, which can be used to measure the amount of load required to relieve the preloading following fitting of the second stay.

14. The aircraft assembly according to claim 5, wherein the preloading linkage comprises a stay.

* * * * *